(12) United States Patent
Chow

(10) Patent No.: US 9,015,166 B2
(45) Date of Patent: *Apr. 21, 2015

(54) METHODS AND SYSTEMS FOR ANNOTATION OF DIGITAL INFORMATION

(71) Applicant: Edmond Kwok-Keung Chow, Hong Kong (HK)

(72) Inventor: Edmond Kwok-Keung Chow, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/631,465

(22) Filed: Sep. 28, 2012

(65) Prior Publication Data

US 2013/0024762 A1    Jan. 24, 2013

Related U.S. Application Data

(63) Continuation-in-part of application No. 13/615,079, filed on Sep. 13, 2012, now abandoned, which is a continuation-in-part of application No. 12/505,328, filed on Jul. 17, 2009, now Pat. No. 8,301,631.

(60) Provisional application No. 61/182,693, filed on May 30, 2009.

(51) Int. Cl.
  *G06F 17/30*    (2006.01)
  *G06F 17/24*    (2006.01)

(52) U.S. Cl.
  CPC ........ *G06F 17/30876* (2013.01); *G06F 17/241* (2013.01)

(58) Field of Classification Search
  CPC ................................................ G06F 17/30867
  USPC .................. 707/705, 706, 758, 770, 728, 732
  See application file for complete search history.

(56) References Cited

U.S. PATENT DOCUMENTS 6,631,496 B1    10/2003    Li et al.
6,877,137 B1    4/2005    Rivette et al.

(Continued)

FOREIGN PATENT DOCUMENTS

AU    200071866    11/2000
CN    1157965    8/1997

(Continued)

OTHER PUBLICATIONS

International Patent Application No. PCT/CN2009/072808: International Search Report dated Feb. 4, 2010, 3 pages.

(Continued)

*Primary Examiner* — Etienne Leroux
*Assistant Examiner* — Cindy Nguyen
(74) *Attorney, Agent, or Firm* — Baker & Hostetler LLP

(57) ABSTRACT

Methods and system for performing annotation of digital information are provided. One method includes searching for items of interest using a search engine. Once the URIs associated with the item of interest are identified, a plurality of attributes are provided that may be associated with each URI. A user may provide the values for the attributes or the system may suggest values for the attributes based on information associated with each URI. Once the attributes and values are assigned, the annotated URI along with the attributes and values is stored. Another method provides for sharing of the annotated information. A user may communicate annotated information to an external storage system for sharing with other users having access to the external storage system. Another method provides for automatic updates of the annotation entries by periodically fetching the digital information associated with each URI and updating the values associated with each attribute.

20 Claims, 13 Drawing Sheets

(56) References Cited

U.S. PATENT DOCUMENTS

| | | | |
|---|---|---|---|
| 7,058,695 B2 | 6/2006 | Takagi et al. | |
| 7,085,736 B2 | 8/2006 | Keezer et al. | |
| 7,421,448 B2 | 9/2008 | Spork | |
| 7,536,323 B2 | 5/2009 | Hsieh | |
| 7,761,436 B2 | 7/2010 | Norton et al. | |
| 8,121,902 B1 * | 2/2012 | Desjardins et al. | 705/26.1 |
| 2004/0138946 A1 | 7/2004 | Stolze | |
| 2004/0199430 A1 | 10/2004 | Hsieh | |
| 2005/0065958 A1 | 3/2005 | Dettinger et al. | |
| 2005/0234891 A1 | 10/2005 | Walther et al. | |
| 2007/0022098 A1 | 1/2007 | Malik | |
| 2007/0022135 A1 | 1/2007 | Malik | |
| 2008/0005064 A1 * | 1/2008 | Sarukkai | 707/3 |
| 2008/0195495 A1 | 8/2008 | Rubin et al. | |
| 2009/0044144 A1 * | 2/2009 | Morris | 715/804 |
| 2010/0011282 A1 * | 1/2010 | Dollard et al. | 715/233 |

FOREIGN PATENT DOCUMENTS

| | | |
|---|---|---|
| CN | 1319817 | 10/2001 |
| CN | 1518702 | 8/2004 |
| EP | 2065809 | 6/2009 |
| WO | WO 2006/026578 | 3/2006 |
| WO | WO 2008/011091 | 1/2008 |

OTHER PUBLICATIONS

Chinese Patent No. G092236: International Search Report, dated Sep. 16, 2009, 7 pages.

Chinese Patent No. G090544: International Search Report, dated Sep. 16, 2009, 5 pages.

* cited by examiner

FIG. 10

METHODS AND SYSTEMS FOR ANNOTATION OF DIGITAL INFORMATION

CROSS REFERENCE TO RELATED APPLICATIONS

This application is a continuation-in-part of Ser. No. 13/615,079, filed Sep. 13, 2012, which is a continuation-in-part of U.S. patent application Ser. No. 12/505,328 filed on Jul. 17, 2009, which claims benefit under 35 U.S.C. §119(e) of U.S. provisional application No. 61/182,693, filed May 30, 2009, the contents of which are incorporated herein by reference in their entirety.

BACKGROUND

As the use of the Internet proliferates, it is increasingly being used as a vehicle for buying and selling of goods and services. The vendors who sell their goods or services on the Internet are often referred to as "online merchants." These online merchants primarily use a website to advertize their products and services and secure orders from consumers for their offerings. For instance, a typical online merchant webpage may display relevant information about a product including but not limited to its price, sales tax, shipping and warranty information and details about the product. The information displayed on a website is often encoded in a digital form. Such information may be generally referred to as 'digital information.' One of the most difficult tasks for a consumer is to determine which online merchant is offering the best bargain for a particular product or service. To this effect, consumers often engage in bargain hunting where they may visit online merchants and bookmark the webpage displaying information about the product or service of interest to them. In some instances, the consumer may add some information e.g., metadata, of his own to each product web page so bookmarked. This activity of adding additional information is sometimes referred to as "annotation" or "tagging."

The idea of tagging is not limited to textual information. Any type of digital information e.g., audio, video, graphics, etc. may be tagged. For example, a person watching or having watched a video online may provide annotation against the video or the location of the video.

However, the conventional techniques for gathering and analyzing such digital information often involves manual processing of the tags and annotations. For example, a webpage or a Web resource on the World Wide Web ("Web") is most often identified by a Uniform Resource Identifier (URI). Other digital information available on a storage medium or a network may be identified by a "recall handle" similar to a URI. Like the URI, each recall handle is unique and is associated with only one item or page of information. Conventional techniques allow use of associating relevant keywords and phrases with a webpage, which is otherwise contextually uncertain. A user may be able to group contextually related web pages for later use. However, in some instances, web pages that share the same or similar annotation keywords and phrases may be grouped together even if they are contextually different. In addition, if the number of related web pages in a group lack specific information of interest to the user, it becomes difficult for the user to judge the relevancy of the web pages in light of the desired data to be analyzed. For example, a user may bookmark several web pages during his research, which he believes provide the information of his interest. The user may group these pages together as relating to the same item of interest. However, these bookmarked pages may not contain information that is actually relevant to what the user is searching. Subsequently, if the user attempts to extract relevant information from each of these bookmarked pages, he will have difficulty in evaluating the merits and relevancy of the information contained in the bookmarked web pages. The level of difficulty encountered by the user is directly proportional to the number of web pages being bookmarked.

Therefore, there is a need in the art for a method for efficient annotation of digital information.

SUMMARY

Embodiments of this invention provide methods and systems for annotating digital information. In an embodiment, method includes receiving a search term, presenting a plurality of search results based at least in part on the search term, the search results being presented by providing a plurality of unique identifiers, wherein at least one of the search result is associated with one of the unique identifiers, receiving input indicative of a selection of a first unique identifier. The method further includes providing a list of one or more attributes to be associated with the first unique identifier, receiving data to be associated with the one or more attributes, annotating the first unique identifier with the one or more attributes, which include data from the one or more pages, and saving, in a storage medium, the annotated first unique identifier.

Other embodiments of the present invention provide a method for sharing of annotated digital information. In an embodiment, the method includes presenting a user with information that matches a search term, wherein each page is identified by a unique identifier, identifying one or more attributes to be associated with a first unique identifier from the unique identifiers for the pages, receiving data to be assigned to the one or more attributes, annotating the first unique identifier by associating the one or more attributes with the first unique identifier, and communicating the annotated first unique identifier to an external system, the external system configured to store the annotated first unique identifier in a database.

Still other embodiments of the present invention provide a system for performing annotations to digital information. In an embodiment, the system may include a client computer configured to execute a search query based on a search term. The client computer may further include a user interface module configured to accept the search term and present search results to a user and an annotation collection module configured to communicate with the user interface and one or more search engines to provide search results to the user interface. The system may further include an annotation collection service. The annotation collection service may include a database module configured to store annotated URIs and information associated with the annotated URIs, an annotation engine configured to communicate with the annotation collection module to exchange annotation information, a retrieval module configured to receive queries from the client computer and provide information about annotated URIs to the client computer, and a fetching module communicably coupled to the annotation engine for receiving caching requests and providing cached information to the annotation engine.

Some embodiments of the present invention provide a user interface that includes a first section for accepting a search term, a second section for selecting a search engine to execute the search term, a third section for displaying a unique identifier for a webpage or website identified by the search engine, a fourth section for displaying at least a portion of information included on the identified webpage or website, a fifth section for selecting an attribute to be associated with the unique identifier, and a sixth section for entering data to be associated with the selected attribute.

The following detailed description, together with the accompanying drawings will provide a better understanding of the nature and advantages of the present invention.

BRIEF DESCRIPTION OF THE DRAWINGS

FIG. 10 illustrates a sample annotation summary user interface screen according to an embodiment of the present invention.

DETAILED DESCRIPTION OF ILLUSTRATIVE EMBODIMENTS

Certain embodiments of the present invention provide a method and system for annotating digital information and sharing the annotated digital information among multiple users. In the present application, the information to be annotated is referred to as "digital information." Digital information may be any information that is available in a digital format. For example, digital information may include textual information, audio information, video information, or graphical information. Further, a single unit of digital information may include multiple units. For example, a common unit of digital information available on the Web is a website or a webpage, and a website may include multiple webpages. A unit or page of the digital information may be represented by a unique recall handle that provides a reference or link to that unit or page of the digital information—for example, a URI of a webpage or a file pathname for a video clip. In addition, a single unit or page of digital information may include one or more subunits or sub-pages, each subunit or sub-page having its own unique recall handle. A network may be an intranet, Internet or any other network that includes one or more devices that are communicating over the network. Furthermore, the network may include any type of wired or wireless medium.

Figure 1:
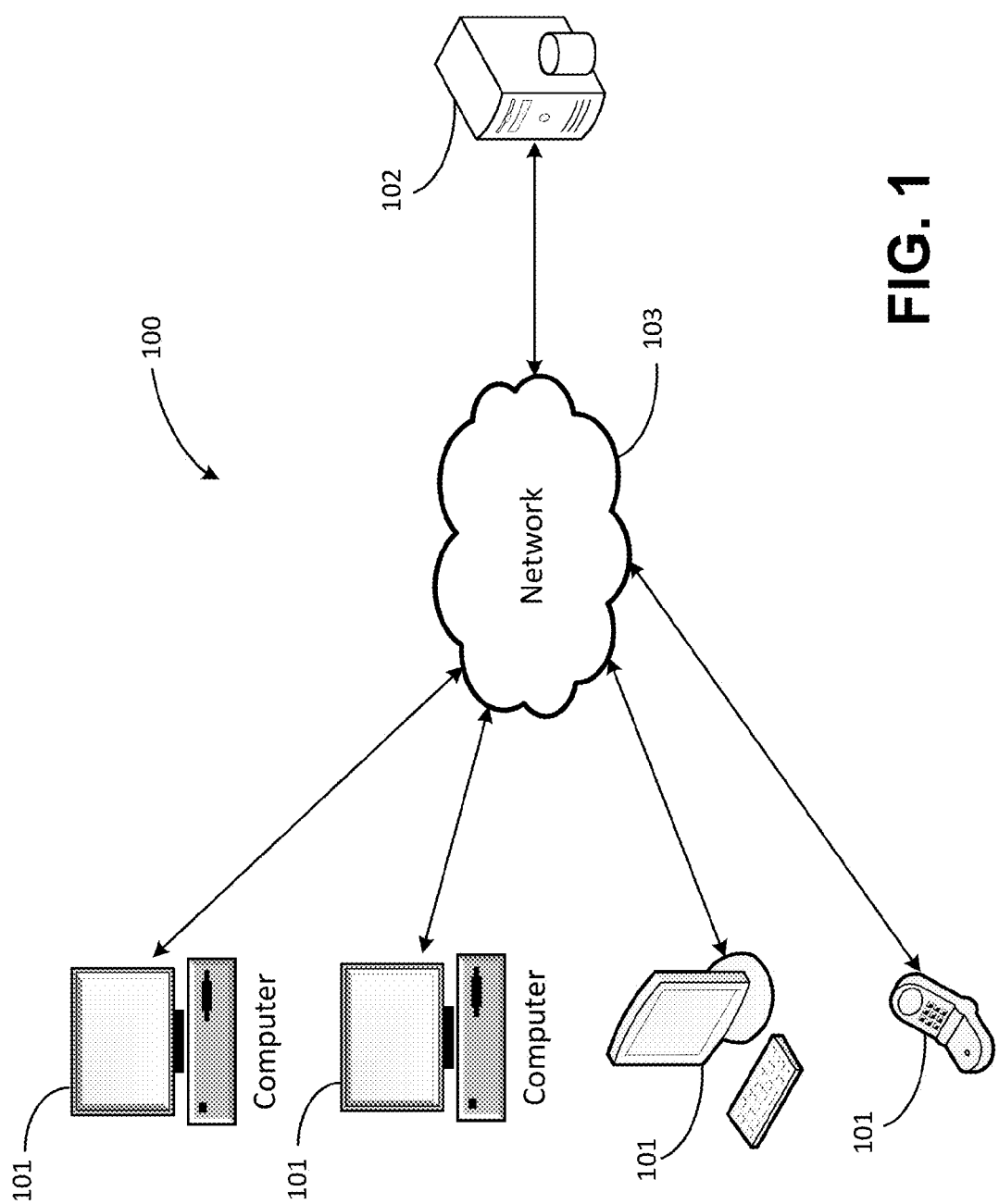
FIG. 1 illustrates a system for performing annotations according to an embodiment of the present invention.

FIG. 1 is a simplified schematic of a system 100 for performing and sharing annotations according to an embodiment of the present invention. System 100 may include one or more client computers 101. Client computer 101 is any general-purpose computer that may communicate with other computers over a network and has the capability of connecting to the Internet. In one embodiment, client computer 101 may be a portable or mobile communications device having the requisite functionality, e.g., cellular phone or a personal digital assistant (PDA). System 100 may also include a database server 102. Database server 102 may be any general-purpose computer capable of hosting a database and communicating with multiple client computers over network 103. Network 103 may be an Intranet, Internet, or any other network, either closed or open. Client computer 101 and database server 102 may communicate using a wired or wireless medium. Each client computer 101 may include a web browser for accessing and browsing the Internet. In addition, client computer 101 may also include an application resident in its memory (not shown) that may provide a user interface through which a user may perform annotations. In some embodiments, the user interface may reside as a toolbar and may be integrated into a web browser resident of client computer 101.

In some embodiments, annotation includes creating an annotation entity by associating data or metadata to a particular anchor information. This anchor information may be the uniform resource identifier (URI) or the recall handle that identifies the digital information. An annotating entry or annotation entity may comprise one or more attributes. An annotation entity may also include a description or specification of an object or item to which the attributes are associated. An attribute may include a name, a value, and a measurement unit for the value. The value of an attribute may be scalar or vector. For comparing attributes, they must be compatible with each other. For example, an attribute is compatible with another attribute if the values of the attributes may be compared in an analysis, whether numerical, contextual, or otherwise. Attributes having the same or equivalent names or meanings (e.g., language, synonym, abbreviation, matching code) are compatible with one another by declaration. The determination of compatibility between two attributes includes but is not limited to orthographical, semantic, and manually assigned equivalence between attribute names. In some embodiments, an attribute may be customized, e.g., its meaning, valid value ranges and possible measurement units may be determined and given a name or code for reference.

An attribute is a characteristic trait or property that serves to define or describe an object of interest and is free of ambiguity or subjective interpretation. An object of interest may be a thing, an idea, a product, an offer, an activity, a purpose, a context, etc. For example, the price included in an offer to sell a book is an attribute of the offer. A user provided rating of the book on a website is not an attribute of the book per se, because the same book may have an entirely different rating on another website since rating is a subjective assessment of a book and may vary enormously between different users. In the other words, an attribute of rating without further qualification is ambiguous and may not be used for meaningful comparison with another attribute that may also offer rating information. Hence, such a rating alone is not an attribute of the book. In contrast, a rating qualified by its source, e.g., the name of the website where the rating is obtained and the "as of" date, may be regarded as an attribute of the book. For example, the rating of a particular program or episode on television when it was first aired is an attribute for the particular program or episode.

Comparative analysis such as relational comparison may be performed on compatible attributes. The results obtained from the analysis may be sorted, filtered, and searched. In some embodiments, numerical weights and score generating formulas may also be associated with the individual attributes during a comparative analysis to determine the desirability of one resource over another resource among resources having one or more compatible attributes in common.

In some embodiments, the anchor information that is used for the annotation is the recall handle of the digital information. All the annotations are associated with this unique recall handle regardless of the location of the data being used for annotation.

Figure 2:
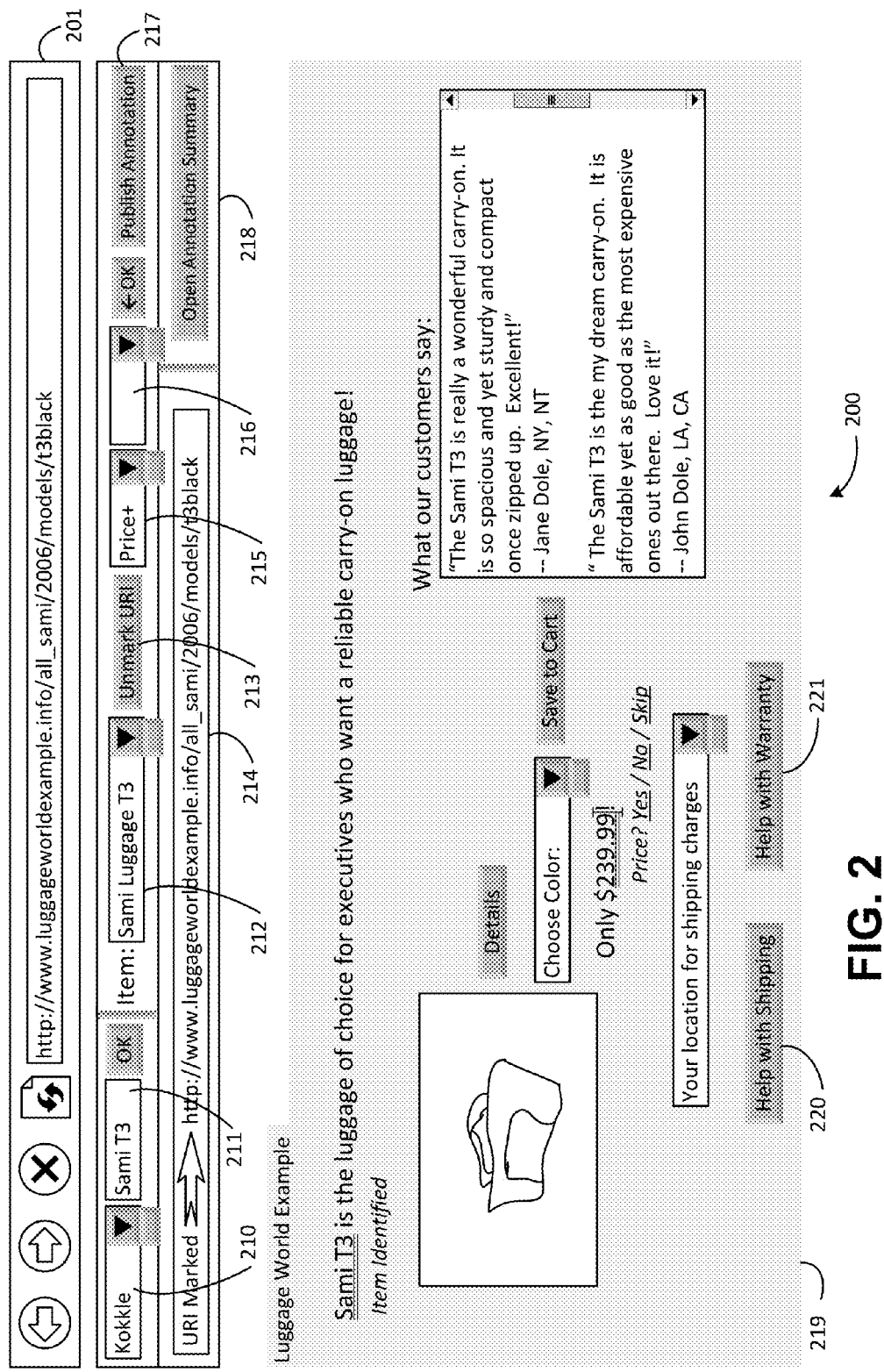
FIG. 2 is a sample user interface that may be used to perform annotations according to an embodiment of the present invention.

FIG. 2 is a simplified illustration of an user interface (UI) 200 that may be used by the computer system to perform the annotation according to an embodiment of the present invention. UI 200 may be presented on a computer monitor in the form of a toolbar, which is embedded in a web browser resident on client computer 101 or may be a stand alone application that is resident on client computer 101 described above. UI 200 may be activated by clicking a designated button on the browser or by selecting the UI application from the memory of the client computer. UI 200 includes a display screen 201. Display screen 201 includes section 210 for selecting a search engine. The search engine may be employed to perform an initial search for locating the item of interest. Section 211 provides a location for the user to enter a search term for the subject matter of interest. A search term may include one or more words or phrases, graphics, audio, or video. Section 212 is a pull down menu that provides descriptions or specifications about items of interest that the user has previously created. For example, a user may be interested in buying a piece of luggage belonging to a specific brand, book a flight to New York City, and buy travel insurance. The user may proceed to provide input to the computer system to create three items: "Sami Luggage T3", "Flight to New York", and "Travel Insurance". These created items may appear in section 212. An item may also include additional information or data to further qualify the item, e.g., the minimum and maximum dimensions and weights of the luggage, the origin of the flight to New York, the duration of travel insurance, etc. The item information may also provide or otherwise serve as an initial search term for entry into section 211.

Figure 10:
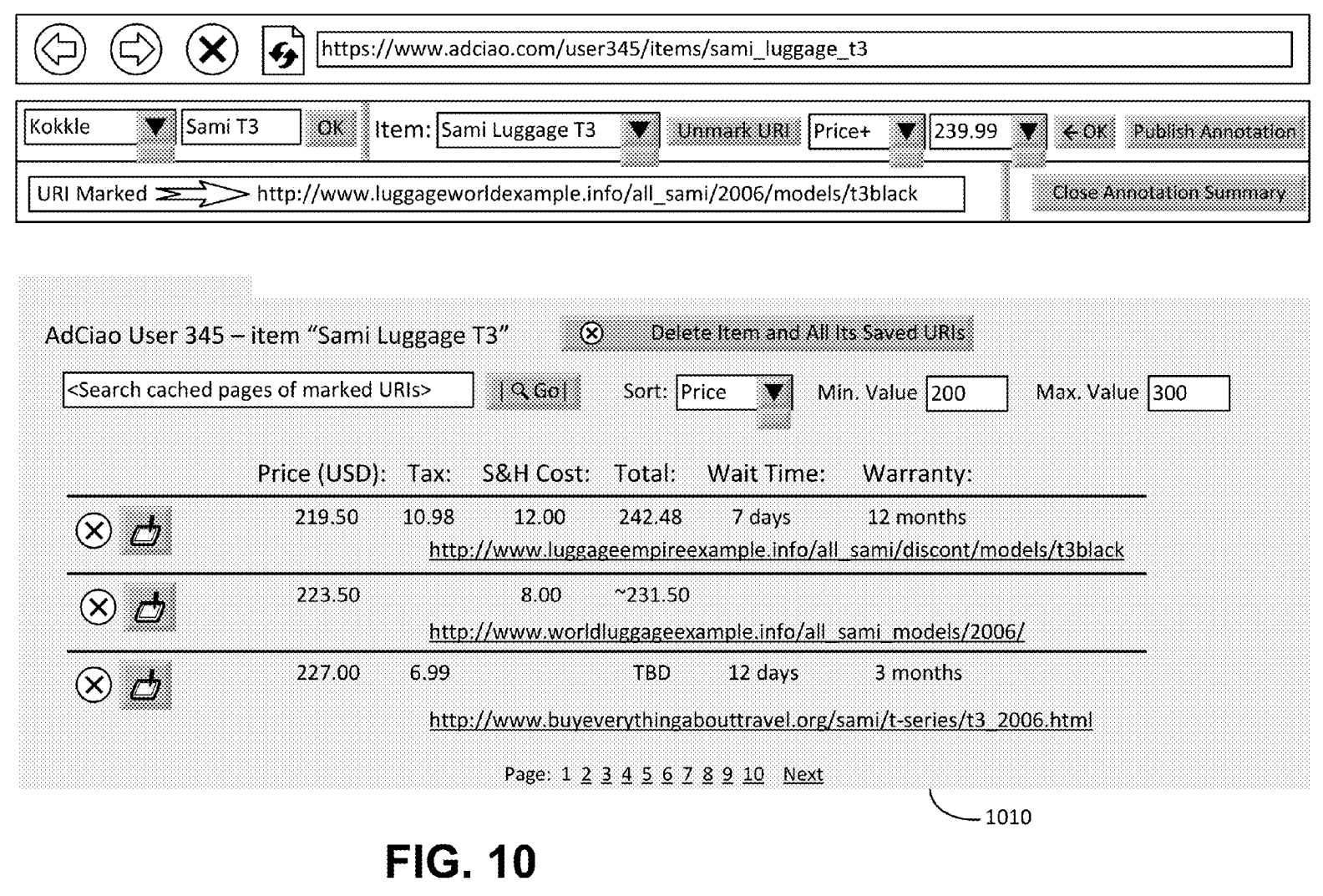

Screen button 213 allows a user to mark (or unmark) a particular recall handle for annotation. The recall handle may be the URI associated with one of the search results delivered when the user executes a search query based on a search term. In one embodiment, the 'marked' recall handle is the recall handle whose webpage is currently on display in section 219. Once a recall handle is marked using screen button 213, the recall handle appears in section 214. In section 215, the user may select from among a plurality of attributes to be associated with the marked recall handle. Alternatively, the user may define his own attributes by entering them in the client computer. In section 216, the user may enter a value to be associated with the selected attribute. In an embodiment, this section may be automatically populated by the client computer based on the information displayed in section 219. Section 219 displays contents of the websites that the user may visit using UI 200. In yet another embodiment, the application may scan the contents displayed in section 219 and suggest values to be populated in section 216. Screen button 217 allows the user to communicate his annotation to an external system or designate the annotated information for sharing with other users on a network. Screen button 218 may allow the user to display a listing of previously annotated recall handles. The listing may be displayed on a separate page and may additionally provide query, filtering, sorting, editing, and navigation facilities for operating and manipulating these recall handles and their annotation data. FIG. 10 shows a sample listing of previously annotated recall handles that may be displayed upon selection of screen button 218.

Figure 3:
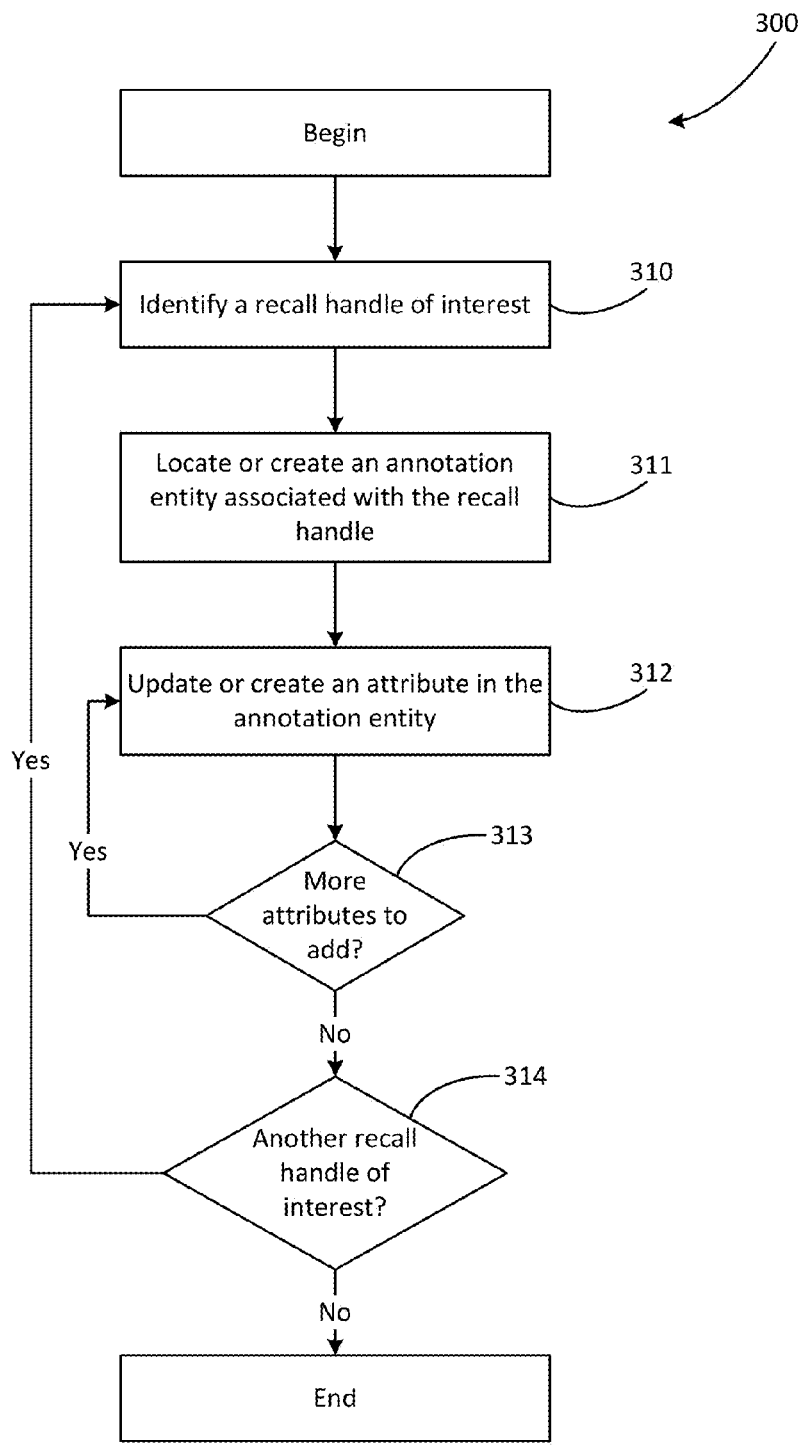
FIG. 3 is a flow diagram of a process for assigning attributes to a URI according to an embodiment of the present invention.

FIG. 3 is a high level flow diagram of a process 300 for assigning attributes to a URI or recall handle associated with digital information according to an embodiment of the present invention. At step 310, the URI associated with particular digital information (or some online resource such as those available on the Web) is identified. For example, the URI identified may be the one provided by the search engine based on a search term. In some embodiments, the user may enter a URI manually e.g., file path information of the location of a video clip on the user's computer. At step 311, an annotation entry is created for that URI, e.g., by using UI application 200. In an embodiment, prior to creating an annotation entry, the system may search for any existing annotations for that URI. At step 312, the user adds data to the selected attribute, e.g., the user may add a purchase price in dollars for an attribute "price" associated with the item of interest. In an embodiment, if there is already an existing attribute with data associated with it, the user may be given an option to update the attribute with the new data. At step 313, it is determined whether additional attributes for the selected item of interest are to be added. If there are more attributes to be added, the process returns to step 312 to allow user to enter additional attributes. If at step 313 it is determined that, no additional attributes are to be added, the system may check for a new URI to be annotated at step 314. If there is no new URI to be annotated, the process ends. If there is a new URI to be annotated, the process returns to step 310.

It will be appreciated that process 300 described herein is illustrative and that variations and modifications are possible. Acts described as sequential may be executed in parallel, order of acts may be varied, and acts may be modified or combined.

Figure 4:
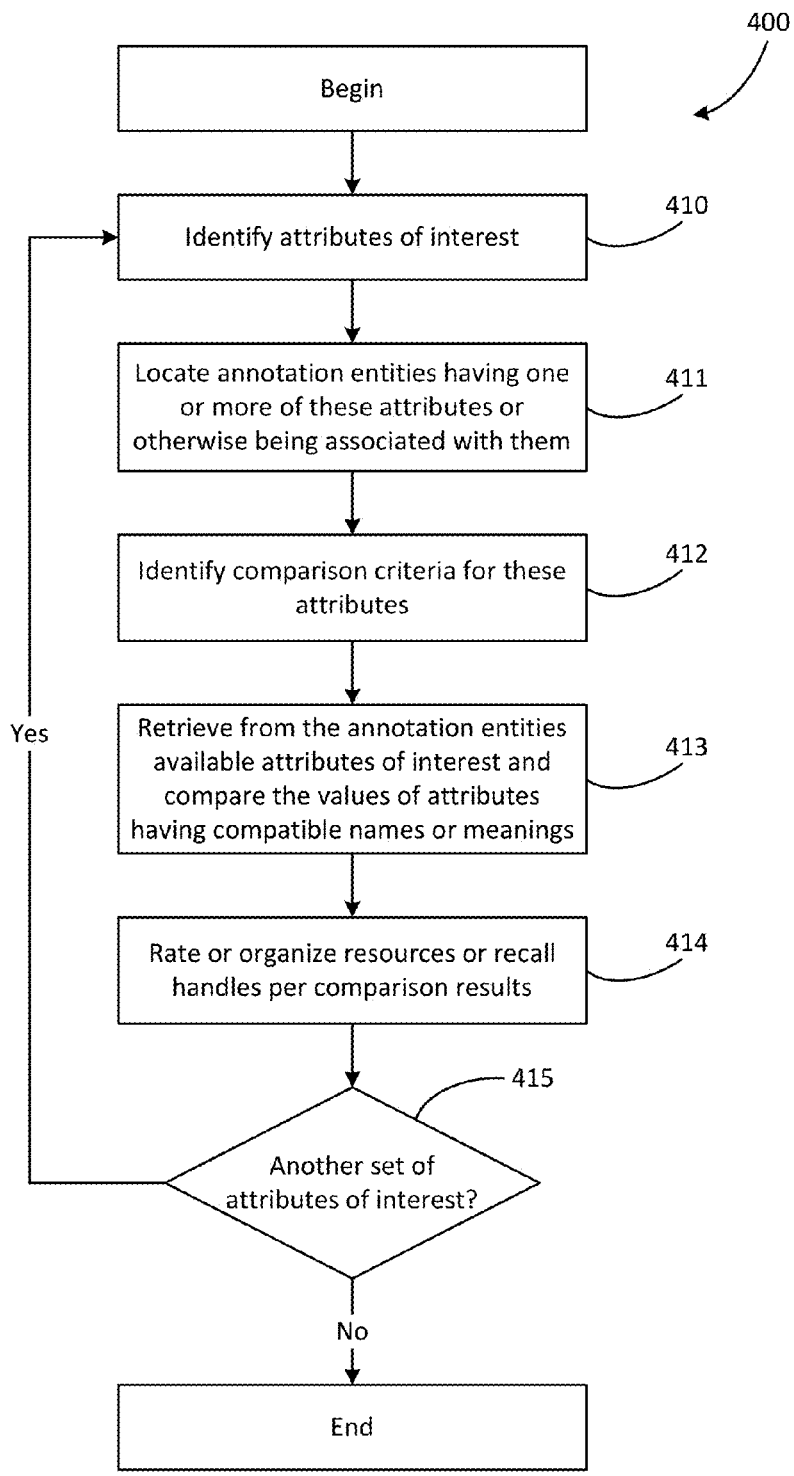
FIG. 4 is a flow diagram of a process for comparing attributes of various annotated URIs according to an embodiment of the present invention.

FIG. 4 is a high-level flow diagram of a process 400 for comparing attributes of various annotated URIs or recall handles according to an embodiment of the present invention. At step 410, the attributes to be compared are identified, e.g., price and warranty period. Next, at step 411, the annotated URIs or recall handles that include the identified attributes are located. As described previously, the annotated URIs/recall handles may be stored on an internal storage medium of client computer 101 or on the remote database server 102. Once the annotation entries that are associated with the URIs of interest are identified, comparison criteria for the attributes are determined at step 412. The comparison criteria may specify a priority of one attribute over another to be considered during comparison and subsequent presentation of the comparison results. For example, the attribute 'warranty period' may be more important than the attribute 'price'. In addition, the comparison criteria may also specify desirability of relation order for each attribute. For example, for 'price', a lower number is more desirable whereas for 'warranty period' a higher number is more desirable. At step 413, the data associated with the identified attributes for all the selected URIs is retrieved and compared. At step 414, results of the comparison are presented to the user. The results may be presented in the form of a rating or a score with the respective URIs listed per the comparison criteria. For instance, a request to locate the cheapest price for an item would result in a list of URIs/ recall handles whose "price" attribute has one of the lowest values. In some embodiments, if the price is provided in different currencies, the differences in the currency exchange rates may be reconciled automatically and results provided in the currency of user's choice. At step 415, the system may check to see if another set of attributes is to be compared. If at step 415, it is determined that no other attribute is to be compared, the process ends. On the other hand, if there are more attributes to be compared, the process returns to step 410.

It will be appreciated that process 400 described herein is illustrative and that variations and modifications are possible. Acts described as sequential may be executed in parallel, order of acts may be varied, and acts may be modified or combined.

Figure 5:
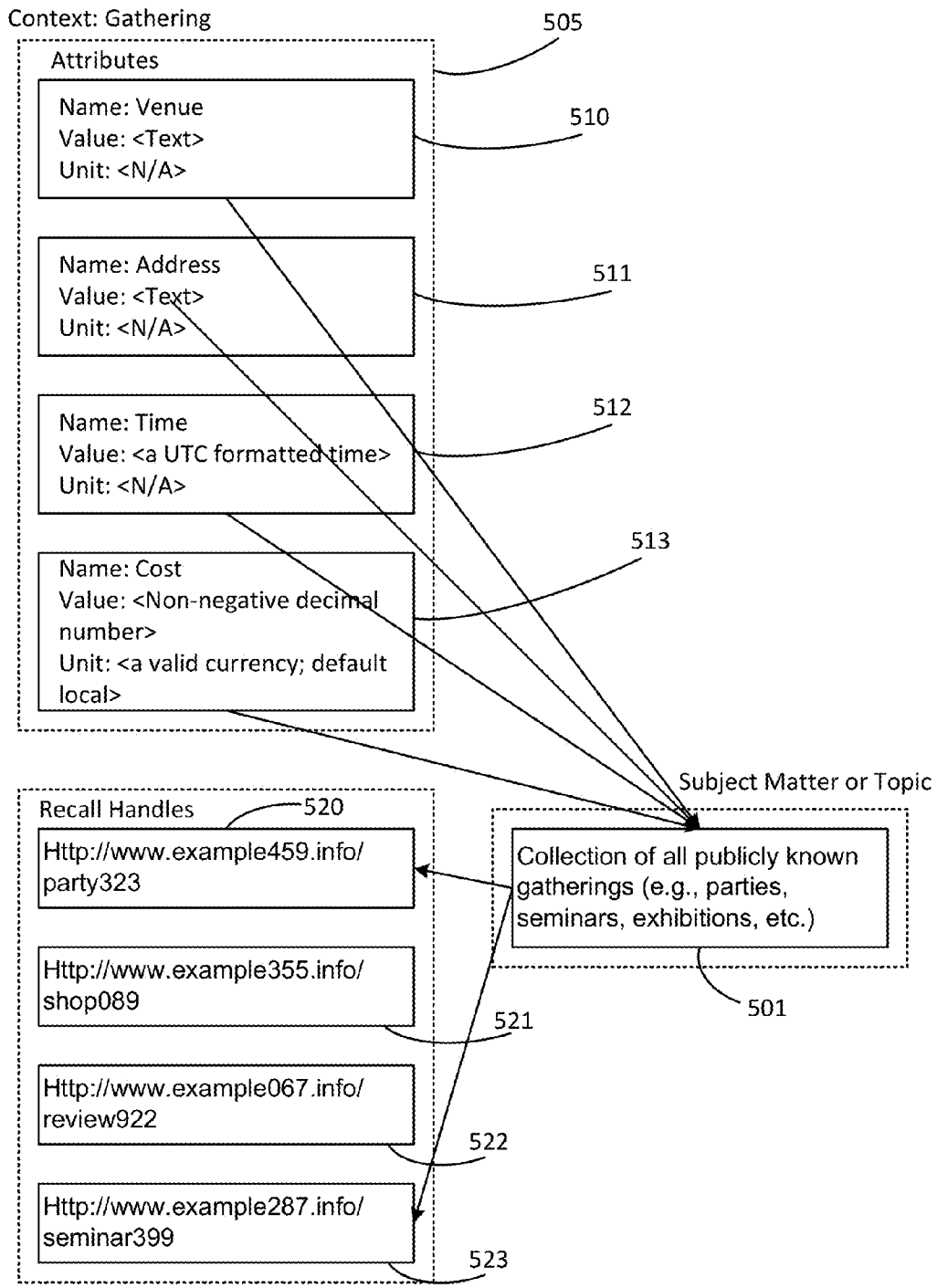
FIG. 5 is a block diagram illustrating subject matter annotation according to an embodiment of the present invention.

Another embodiment of the present invention allows a user to perform subject matter specific annotations. FIG. 5 illustrates subject matter specific annotation according to an embodiment of the present invention. In this illustration, subject matter 501 of interest is 'collection of all publicly known gatherings', e.g., seminar, exhibition, party, etc. Subject matter 501 is related to an overall context of gathering 505. Another subject matter of interest in the gathering context may be 'collection of all scheduled sports events'. The context of scheduled sports events may be a sub-set or sub-context of context 505. Attributes 510 513 are defined for context 505. For example, for a gathering, several attributes such as venue 510, address 511, time 512, and cost to attend 513 may be defined. It is to be noted that the attributes mentioned above are for illustrative purposes only and one skilled in the art will realize that any number of attributes may be defined for a particular context or subject matter. In addition, for subject matter 501, there may be multiple URIs/recall handles 520 523 available for annotation. The user may use the client computer to annotate any number of the available URIs with one or more of the attributes. For example, recall handles 520 and 523 may be annotated with attributes 510-513. One skilled in the art will recognize that a number of permutations and combination may be achieved between the attributes and the recall handles.

Figure 6:
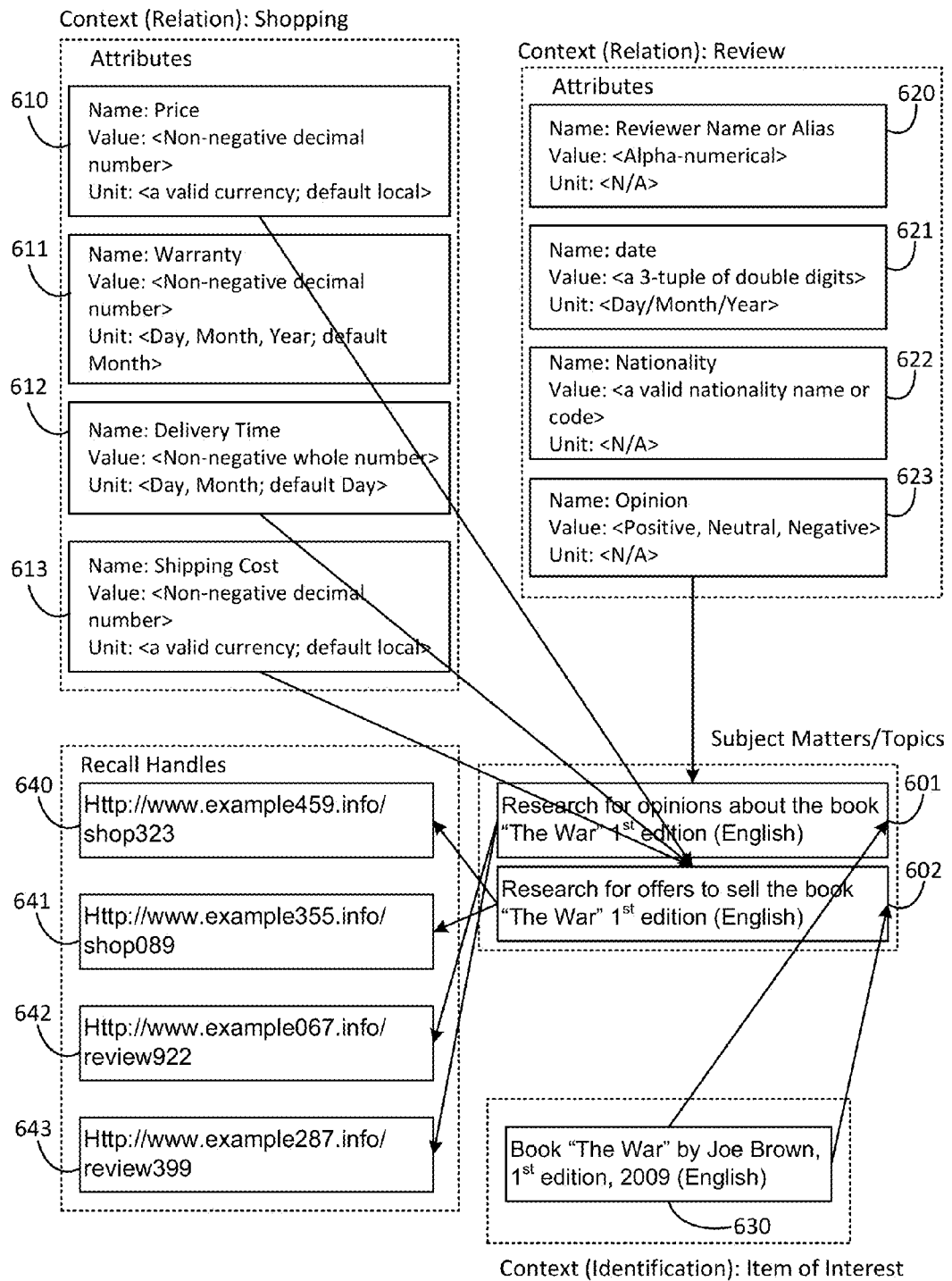
FIG. 6 is a block diagram illustrating subject matter annotation according to another embodiment of the present invention.

FIG. 6 illustrates an example of performing annotations where a subject matter, activity, or topic of interest may have more than one context associated with it according to an embodiment of the present invention. In this embodiment, an item of interest is a book titled "The War." There may be several subject matter/activities/topics associated with this item of interest, e.g., purchasing the book (601) and finding out reviews (602) of the book. It is possible that relevant information for annotation is available at the same URI or at different URIs. Attributes such as price (610), warranty (611), delivery time (612), and shipping cost (613) are defined for the 'shopping' context with which subject matter 602 is associated. Attributes such as name of the reviewer (620), date (621), nationality of the reviewer (622), and the actual opinion (623) are assigned to subject matter 601 under the 'review' context. In addition to the aforementioned attributes, additional attributes such as title, author, language, and edition may be assigned to subject matters 601 and 602 under 'Book' context 630 and are used to describe the item of interest, i.e. the book "The War." The information about the book, whether in textual, image or audio form, may be used as query to search for online information of or about the book. One main difference between the shopping (or review) context and the book context is that the former provides attributes for relational comparison while the latter provided attributes for identification comparison. While the use of attributes may improve the accuracy of both types of comparisons, its absence would typically have a more adverse effect on relational than identification comparison. For instance, to find luggage of meeting certain criteria of dimensions, attributes provide a better specification than just a textual description in freeform. While these attributes may be regarded semantically as identification data for identifying relevant luggage, the attributes are actually used for relation comparison in such identification.

Similar to FIG. 5, one or more recall handles 640-643 may be available for annotation with respect to subject matters 601 and 602. For example, as illustrated in FIG. 6, recall handles 642 and 643 may include information relevant for subject matter 601 while recall handles 640 and 641 may include information relevant for subject matter 602.

Recall handles whose annotations comprise both identification data and attributes for relational comparison provide a better, automated decision making support than those whose user annotations comprise only data of a homogeneous but otherwise undistinguished context. For instance, a user may use the UI described above to search for a book using some identification data for the book (e.g., "Book The War Joe Brown"). The user may then visit the web pages identified by their respective URIs listed by the search engine and through the UI specify attributes (e.g., price, delivery time, shipping cost) against the URIs of those web pages that offer to sell the book. The resulting annotations may comprise identification data for the book and attributes for relation comparison. These annotations may be used for automatic comparison and processing (such as sorting and filtering) with other annotations having compatible attributes as well as the same or equivalent identification data. It is to be noted that identification data need not be the same or equivalent if a user wants to compare, for example, two different but competing products having non matching identification data. Such comparison and processing is able to discern data for identification from those for relational comparison.

Figure 7:
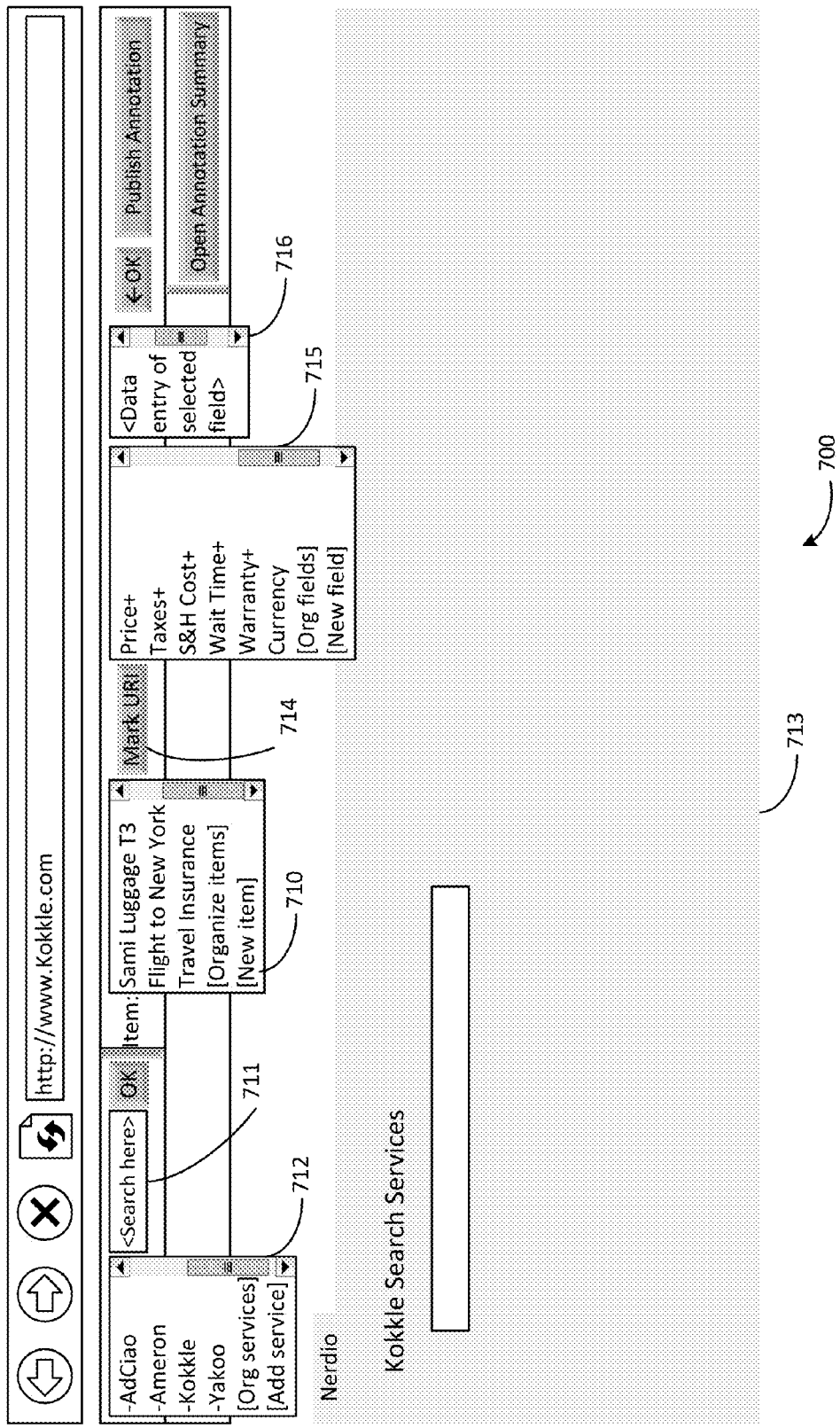
FIG. 7 illustrates a sample display screen of a user interface according to an embodiment of the present invention.

FIG. 7 illustrates UI 700 with expanded drop down boxes showing the various options for annotating a URI/recall handle identifying digital information. According to an embodiment of the present invention, a process for creating an annotation using UI 700 will now be described. A user may select an existing item or enter information into a client computer to enable the client computer to create a new item of interest using drop down menu 710. For enabling the client computer to create a new item, the user may select '[New Item]' option in drop down menu 710. For instance, a user may be planning for a trip. He may be want to buy luggage of a specific brand, book a flight to New York City, and buy travel insurance. The user may instruct the client computer to create three items: "Sami Luggage T3", "Flight to New York", and "Travel Insurance." An item may also include additional information or data to further qualify the item, such as the minimum and maximum dimensions and weights of the luggage, the origin of the flight to New York, the duration of travel insurance, and so on. Such additional data would help refine the item of interest to become more specific in comparing and matching web pages that provide the item of interest. If the item entry is a newly created entry, the user may submit a search term in section 711 and select a search engine in section 712. The item information corresponding to the item selected in section 710 may be used as an initial search term in section 711. Once the search query is executed by the search engine, a list of web pages offering the item of interest may be displayed in section 713. The user may select 'mark URI' button 714 and the client computer can make the URI whose webpage is being currently displayed in section 713 to become the currently marked URI. In some embodiments, selection of the 'mark URI' button may also trigger other operations like retrieving existing attributes and data for those attributes for that URI and making the retrieved attributes and data available to the user. The user may instruct the client computer to make changes to one or more attributes by selecting the desired attribute in section 715 and specifying new data (value) for the attribute in section 716. Some attributes may include optional measurement units to qualify their data values. These optional units may be implicit, e.g., some unspecified currency of interest for price and shipping data fields, default, e.g. the current date for a time data field, or explicitly chosen, e.g., day, month or year for warranty period. The suffix '+' displayed alongside certain attributes in section 715 indicates that each of these attributes would be used by an auto prompt feature, described later, whereby a user would be prompted for data entry for each such attribute in a successive manner. It is to be noted that any other means to indicate that a particular attribute provides an auto-prompt feature may be used in place of the '+' symbol but is not required by the present invention. Each attribute may provide further functionality in addition to providing a named piece of data with an optional measurement unit. The currency attribute, for example, would enable the price, taxes, and shipping attributes to be compared consistently with other price, taxes, and shipping data fields if the latter are specified in different currencies.

Changes made to the attributes are automatically updated. If there is an existing annotation entity associated with the marked URI, any new item description specified in section 710 may be merged with the identification data of the existing annotation entity, because such an existing annotation entity could contain identification data that may be different from the current item description (e.g., "Sami bag T3" instead of "Sami Luggage T3"). Reconciliation of identification information may take several forms. For example, the two descriptions may be merged with each other with user confirmation, the old description may be replaced by the new description, or the user may be asked to select one of descriptions.

Selecting the "[New field]" or "[Org fields]" selections on the pull down menu 715 presents a page where the user may be given a plurality of attributes to choose from. These attributes may be organized by categories, e.g., context and subject matter, and may be searchable, for inclusion in the menu. Each attribute may further be given its meaning, acceptable values, and possible measurement units. Relationship with and dependency on other attributes, if any, would be specified. For example, sum of the Price, Taxes, and Shipping & Handling (S&H) Cost data fields may be designated as a field called "Total Cost", and that their comparative values depending on the Currency field. A user may instruct the client computer to modify the relationships and dependencies of these system defined or user submitted attributes and their respective data fields. The user may also define custom relationships and dependencies complete with rules on interpreting and operating the attributes within the client computer. In addition, the user may further instruct the client computer to share these definitions with other users. A user may also instruct the client computer to create an attribute having a textual name and configure data field take on any value without any measurement unit.

In some instances, digital resources may have information spread over several locations. For example, a website offering a product for sale may have the shipping charges for the product listed on a different webpage than the webpage where price information for the product is provided. In one embodiment, the user may visit other locations, for the same digital resource, to select, identify, or enter data for different attributes without losing the already marked recall handle. For example, for a website, a user may use the "mark URI" button and instruct the client computer to designate the URI of a certain page of the website as the marked URI, while visiting other related pages of the website for identifying data to be used for annotation. The data gathered from the different web pages of the website may then be linked or otherwise related to the marked URI via an annotation entry.

As described earlier, the item information and attributes as provided by a user, along with other information (e.g., the timestamp of the latest attribute update), make up an annotation entity or entry for every marked URI. The corresponding URI may be part of the annotation entity or otherwise be associated with it. Such annotation data may undergo transformation or adaptation for the purpose of transmission, storage, indexing or retrieval. Additional data such as a copy of the webpage of the marked URI may also be kept. In some embodiments, a local repository (e.g., storage medium of client computer 101) or a remote repository (e.g., database server 102) may store and maintain the annotation entities for several URIs in a persistent manner. These repositories may provide the operational means or facilities to manage these persistent entities or entries (e.g., to delete, modify, update, and retrieve) and to query against them, e.g., to retrieve entries by filtering and matching criteria, orthographical, semantic, or otherwise, against their URIs, identification data, attribute names, attribute values and other annotation data, and to perform algorithmic, algebraic, relational and presentational manipulation involving these URIs and their annotation data.

Referring back to FIG. 2, an automated method for annotation according to an embodiment of the present invention is described below. As described above, consider that a user wishes to purchase a piece of luggage, e.g., a Sami T3 handbag as shown in FIG. 2. The user may select the item of interest in section 212 and execute a search query through a search engine from section 210 using information in section 212 as search term. Alternatively, a user may manually enter a search term. The search engine presents a plurality of hyperlinked recall handles (e.g., URIs) along with some other information, such as an excerpt of a webpage associated with its recall handle, presented in section 219. The user engages on-screen button 213 to mark the URI if he perceives a URI to be of interest. Selecting button 213 results in the button toggling to display "unmark URI" and now functions as means to unmark a currently marked URI. Section 214 similarly toggles to indicate either a marked URI or no URI. The system may then attempt to locate and then highlight, emphasize, or otherwise identify the text on the webpage that matches the name of the item or one of its aliases. An alias may be the search term used to search for the item or any other derived name that is closely related to the item. For example, as shown in FIG. 3, "Sami T3" displayed in section 219 is underlined since it is considered an alias or equivalent to the item "Sami Luggage T3" in section 212.

Once the user marks the displayed URI, it becomes the anchor URI to which all the annotations are linked. For example, the marked URI appears in section 214. The system may then prompt and assist the user to supply data for a plurality of attributes in section 215. In one embodiment, the system may auto-select the Price+ attribute and highlight the text, in section 219, that it believes provides the data for the selected attribute. The highlighting could be in form of visual cues such as underlining, textual annotation, color-coded background/foreground inversion of the selected text, or other forms such as audio readout. The highlighted and selected text may be captured as data in the data entry area 216 on the UI for the respective attribute upon user confirmation. For example, as shown in FIG. 2, the value "$239.99" is underlined to indicate that it provides valid data for the "Price+" attribute. Alternatively, the user may highlight and select another piece of text and designate that text as the data for the selected attribute. In yet another embodiment, the user may skip to the next attribute for data entry without entering any data for the currently selected attribute.

In addition, the user may navigate to a different page of the presented information using the shipping and warranty buttons 220 and 221, respectively. The new page may also be presented in section 219. The system may likewise auto-select the appropriate attribute and highlight the relevant text or data from within the displayed information. The user may confirm the selected text or data, add a value to the selected attribute, or skip the selected attribute. Any attribute contributed by the user using data on different pages may be associated, by the client computer, with the anchor URI selected by the user and presented in section 214.

Figure 8:
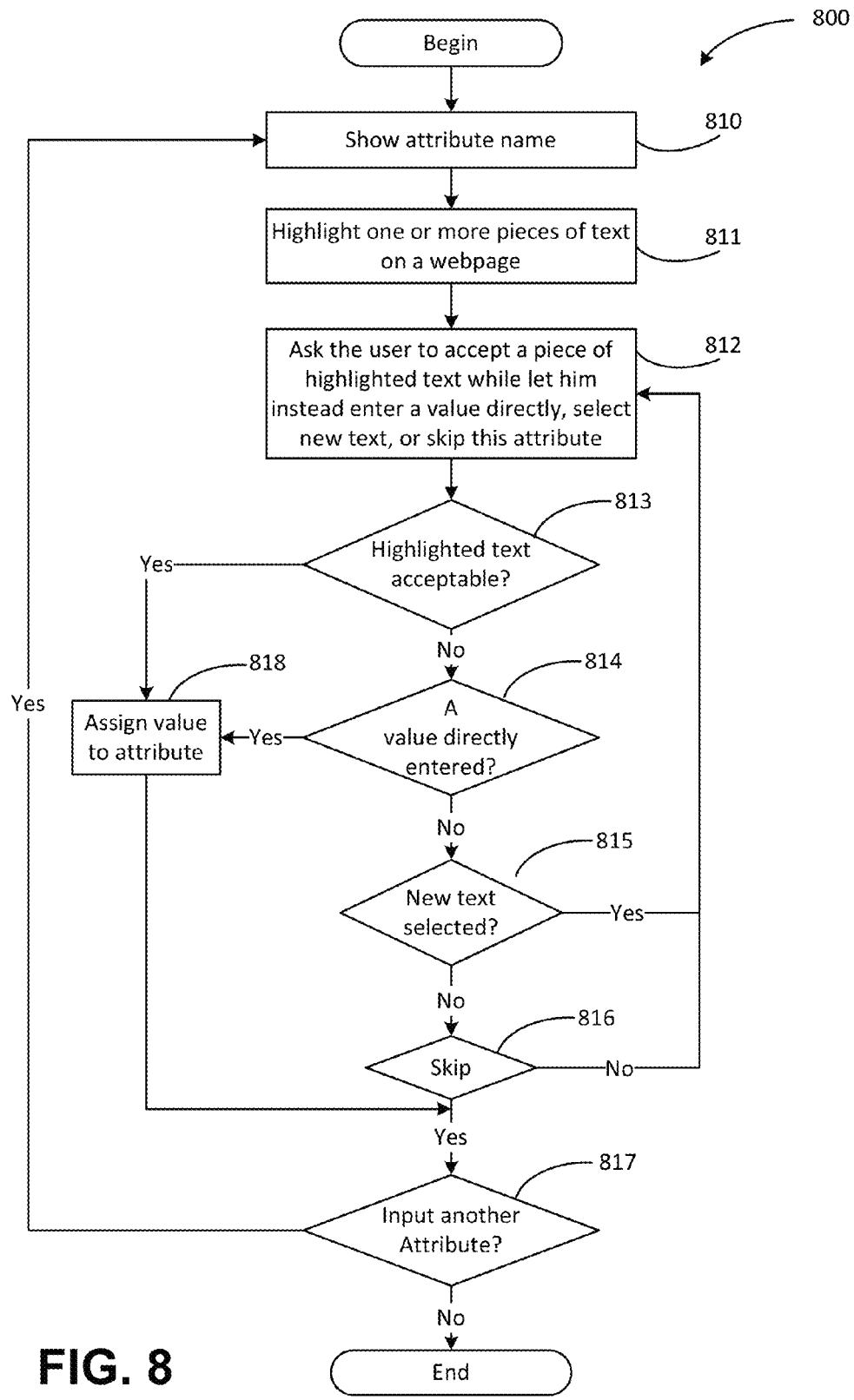
FIG. 8 is a flow diagram of a process for annotating digital information using an auto-prompt feature according to an embodiment of the present invention.

FIG. 8 is a flow diagram for process 800 for annotating information using the auto prompt feature according to an embodiment of the present invention. At step 810, the attribute of interest and the textual description or identification of the attribute is presented to the user. At step 811, one or more pieces of text, from within the presented text are highlighted or made known to the user. In an embodiment, the system may audibly alert the user to the selected attribute and highlighted text. As step 812, the user is provided with a choice to accept the highlighted text and designate the text as data for the selected attribute. In some embodiments, the user may also be given a choice to enter his own data, select some other text, or skip the data entry for that attribute. At step 813, the system checks to see if the user has accepted the highlighted text. If it is determined at step 813 that the user has accepted the highlighted text, the highlighted text is assigned as data for the selected attribute at step 818 and user is asked whether he wants to add data for another attribute at step 817.

If at step 813, the user does not accept the highlighted text, the system checks whether the user has entered a value directly in the data field for the attribute at step 814. If the user enters a value at step 814, the process moves to steps 818 and 817, respectively as described above. If the user does not enter data at step 814, it is determined whether the user has selected some other text at step 815. If the user has selected some other text, the process returns to step 812. If it is determined at step 815 that the user has not highlighted any other text, a determination is made whether the user has indicated that he wants to skip entering data for the selected attribute at step 816. If the user has not elected to skip data entry, the process returns to step 812. If the user selects to skip data entry at step 816, the user is given an option to input data for another attribute at step 817. If the user elects to input data for another attribute, the process return to step 810, if not the process ends.

It will be appreciated that process 800 described herein is illustrative and that variations and modifications are possible. Acts described as sequential may be executed in parallel, order of acts may be varied, and acts may be modified or combined. Information presentations, prompts, selections, and feedbacks as described in process 800 may be visual, audio, tactile, or combinations thereof.

Figure 9:
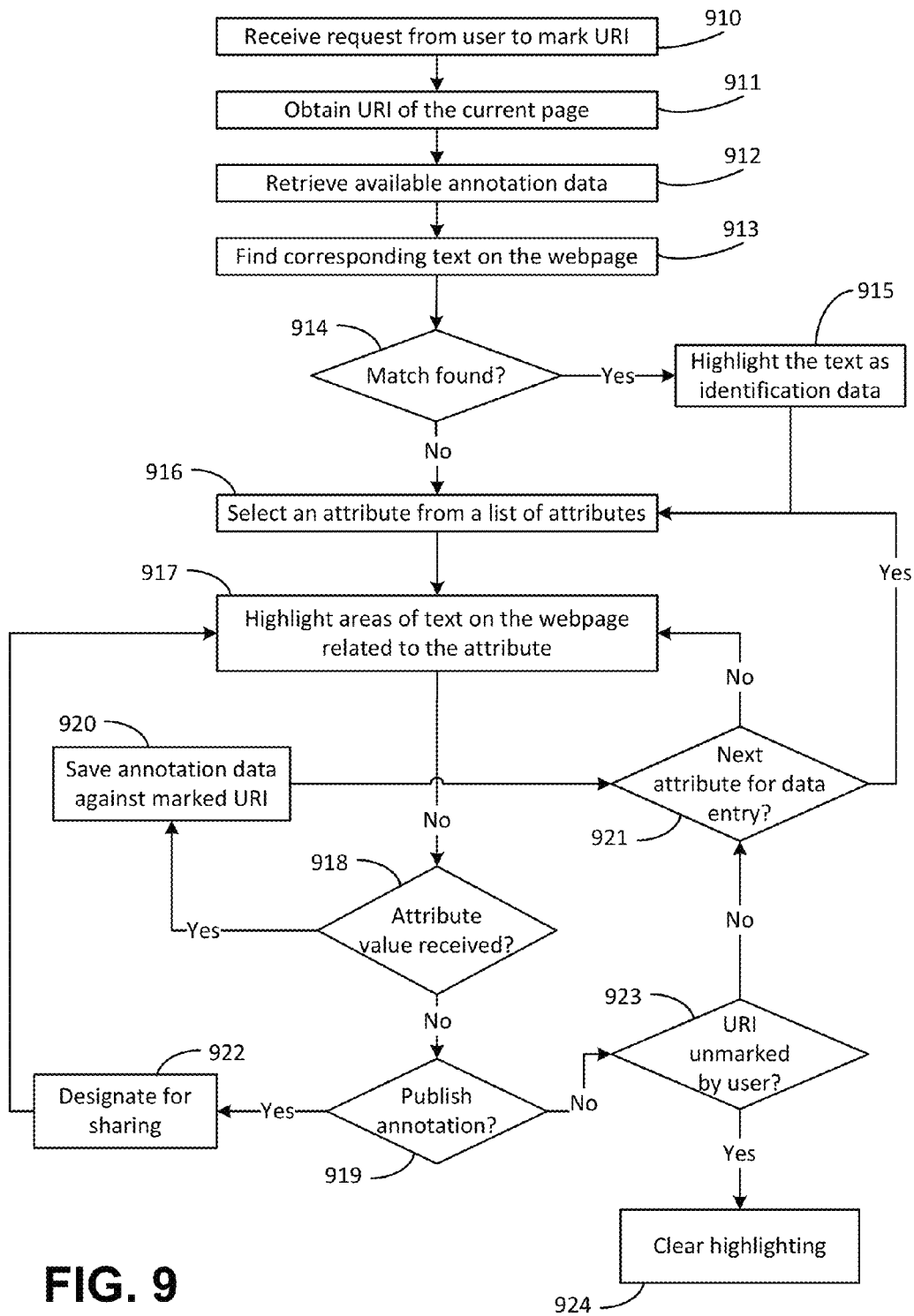
FIG. 9 is a flow diagram of a process for sharing annotations according to an embodiment of the present invention.

FIG. 9 shows a flow diagram of process 900 for sharing annotated digital information according to an embodiment of the present invention. At step 910, the system receives a request from the user to mark a particular URI for annotation. At step 911, the URI may be obtained from, e.g., a browser. Alternatively, the current URI being displayed may be the marked URI. At step 912, existing annotation information for the URI is located. The annotation information may be stored on a local storage medium of the user system or on a remote storage medium. As described previously, the annotation information may comprise identification data related to the item of interest. At step 913, the text for the web page associated with the URI is searched to find whether there is text that matches identification data included in the retrieved annotation information. If a match is found, at step 914, the relevant text is highlighted and designated as identification data at step 915. The new identification data may be appended to the existing identification data or may be overwritten on the existing identification data.

If no match is found at step 914, the system may select an attribute from the list of attributes for the user to update at step 916. At step 917, the displayed text is scanned to reveal/highlight any text that may be considered as valid data for the selected attribute. The user may then designate the highlighted text as data for the respective attributes as discussed in reference to process 800 above. In an embodiment, the user may scroll to various sections of displayed text to locate the relevant highlighted data. Auto highlighting of relevant values for attributes may also be disabled or omitted. The user may be prompted to enter a value of a specific attribute or he may skip to the next attribute or select a piece of text on the webpage as the input for such a value. The value may be assigned to the attribute upon user confirmation. In some embodiments, the value available for an attribute of interest in the existing annotation information obtained at step 912 may be provided as the default value for the attribute. The user may accept the default value as the current value for the attribute. In an embodiment, the name of each attribute of interest may be announced to a user who may respond verbally with either the command "skip" or the value for the attribute in question. The value so received would then be acknowledged audibly and/or visually. The user may then confirm the value before proceeding to the next attribute. In an embodiment, the user may respond to the various prompts by providing his input in textual or audio form. For example, a mobile phone or a multi-media computer may be equipped to provide audio prompts and receive audio input to those prompts from the user.

At step 918, the process checks whether an attribute value was received from the user. If a value is received, the annotation entry is updated with the new value at step 920 and a check is made at step 921 whether there is another attribute to be updated. If no attribute value is received at step 918, the user is given a choice to publish the annotation entry at step 919. If the user chooses to publish the annotation entry, the annotation entry is designated as being available for sharing at step 922. In one embodiment, once an annotation entry is marked for sharing, that entry may be communicated to an external system for storage where other users having access to the external system may use the annotation entry. If the user decides not to publish his annotation entry at step 919, a check is made whether the user has unmarked the URI at step 923. Unmarking a URI stops the data entry process for the marked URI (e.g., no highlighting of the webpage text). However, the annotation process may be resumed by having the same URI marked again.

If at step 923, it is determined that the user has unmarked the URI, the highlighting of the text related to that URI is cleared at step 924. If the user has not unmarked the URI, the user is prompted to enter information for the next attribute at step 921 and text relevant to the next attribute is highlighted for the user. It will be appreciated that process 900 described herein is illustrative and that variations and modifications are possible. Acts described as sequential may be executed in parallel, order of acts may be varied, and acts may be modified or combined. For instance, the locating and highlighting of text on a webpage that may match some identification data of the item of interest may be performed before a user requests a URI be marked. This approach may assist the user to decide relevance of the webpage by automatically locating possible relevant text matching or otherwise related to the item of interest. In addition, information presentations, prompts, selections and feedbacks as described in process 900 may be visual, audio, tactile, or combinations thereof.

FIG. 10 illustrates a sample annotation summary page that may be presented to the user according to an embodiment of the present invention. In one embodiment, the summary may be presented on a UI screen described above. In other embodiments, the summary may be audibly presented to the user. The sample page of FIG. 10 shows annotation summary for the Sami T3 handbag example discussed above. Section 1010 displays annotation summary that includes information about various URIs. The information includes some or all of the relevant attributes that user has associated with the URIs. The page presents a snapshot view of the information that a user may need to make an informed decision about buying the Sami handbag. Although the sample summary page only shows three URIs, the user may designate the maximum number of results to be displayed on a page. Further, if there are more results than may fit on a single page, multiple pages listing the URIs of interest may be generated and the user may navigate to the various pages by selecting from a list of page numbers presented on each page. The summary page also includes the capability of sorting the list according to one or more criteria, e.g., price, total, warranty, etc. The summary page may also include 'total cost'. The total cost is derived value and is a sum of the values for the price, tax and S&H cost attributes. In the instance where an exact value for a particular optional attribute, e.g., tax, is not known, the system may designate the total cost by marking the cost as approximate. In one embodiment, the '~' symbol may be used to indicate an approximate value. In some embodiments, if an essential attribute, e.g., shipping and handling, is not known, the system may designate the total cost as "TBD" (To Be Decided) to indicate its inability to determine the total cost. In other embodiments, the system may approximate the missing values by searching for equivalent information.

Figure 11:
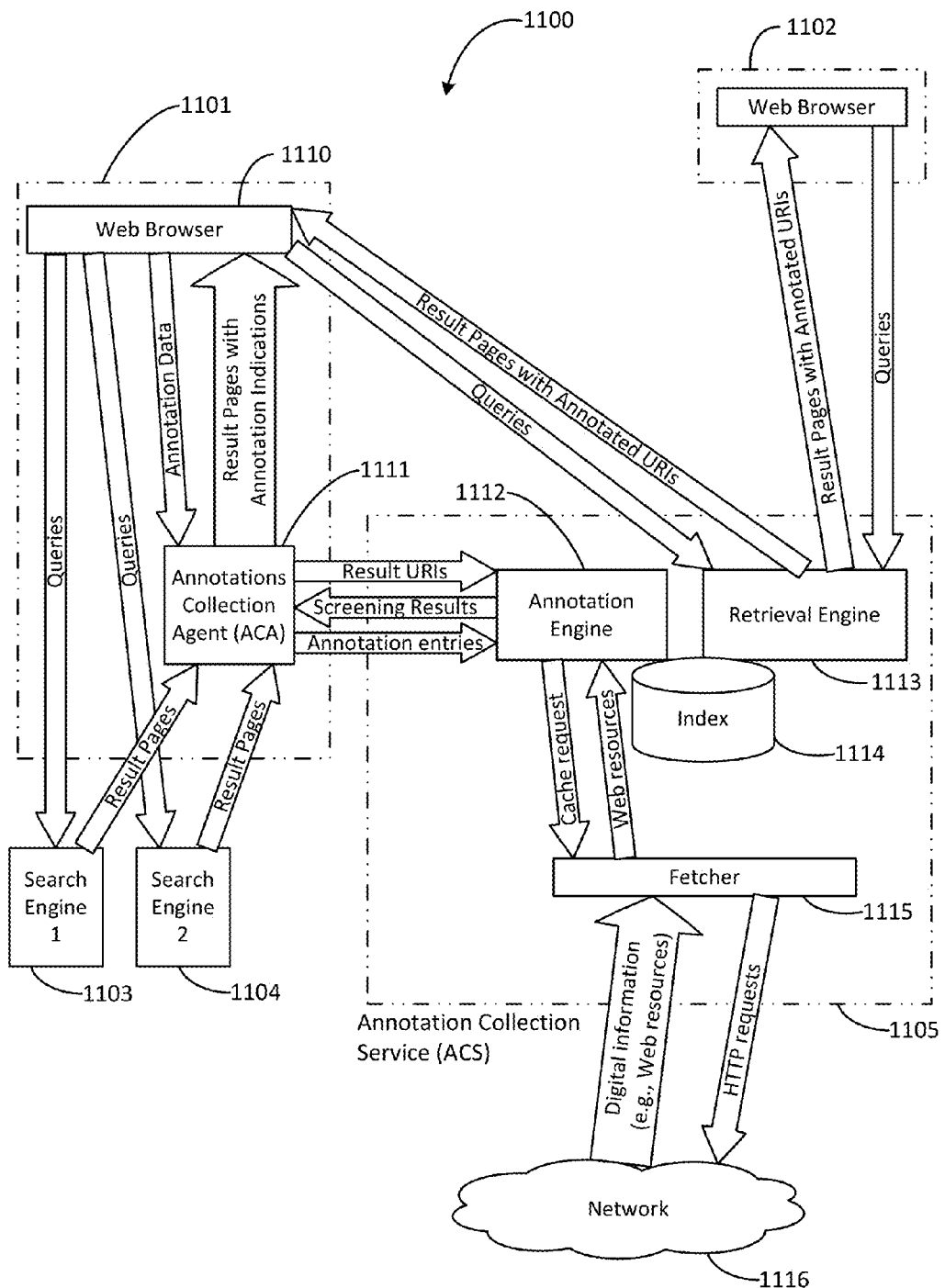
FIG. 11 is a block diagram of a system for sharing of annotated information according to an embodiment of the present invention.

FIG. 11 illustrates a system 1100 for performing annotation collection and retrieval according to an embodiment of the present invention. System 1100 includes client computers 1101 and 1102. Client computers 1101 and 1102 may be any general-purpose computers or devices capable of communicating with other devices over a network and having the ability to connect to the Internet. System 1100 also includes search engines 1103 and 1104. Search engines 1103 and 1104 may be any conventional search engines or specialized search engines. In an embodiment, search engines 1103 and 1104 may be included as part of client computers 1102 and/or 1102. Annotation collection service (ACS) 1105 may provide annotation management functions such as, annotation creation, storage, modification, and retrieval. In some embodiments, ACS 1105 may be referred to as annotation management unit.

Client computer 1101 (or 1102) may provide user interface 1110, e.g., as described in FIG. 2 and provide predefined attributes for a plurality of contexts such as shopping, etc. A user may use user interface 1110 to submit a search query to search engines 1103 or 1104 to search for an item of interest. In an embodiment, a user query may be submitted to multiple search engines concurrently. The results pages from the search engines may be received by annotation collection agent (ACA) 1111. The workings of the ACA are described in more detail below. ACA 1111 communicates with annotation engine 1112 of ACS 1105 in order to exchange information about marked URIs, annotation entries, etc. Retrieval engine 1113 is configured to accept queries from client computers 1101 and 1102 for retrieving information and communicate the results including annotated URIs to the client computers. Index 1114 is a repository or database that stores annotated URIs and the information associated with the annotated URIs. For example, information associated with annotated URIs may include item description and content information represented by the URI. Fetcher 1115 may communicate with network 1116 to collect digital information based on requests from annotation engine 1112. For example, upon receipt of an annotation entry or related information from ACA 1111, the annotation engine may send a request to fetcher 1115 to cache one or more webpages implicated by the URI to which the annotation corresponds or is otherwise associated. Fetcher 1115 may periodically fetch web pages associated with a URI and cache these web pages in index 1114. If a particular URI is no longer valid, fetcher 1115 may report this invalidity to annotation engine 1112, which may update index 1114 accordingly. Annotation engine 1112 may analyze these fetched web pages for information to update the attributes of existing annotation entries or create new and more recent annotation entries using attributes so updated. For example, a fetched web page may be compared with an older web page of the same URI. The differences in content, specific elements or parts of the content, and the locations or identities of these differences in relation to the locations or identities of the data for the attributes accumulated since the previous annotation entry may provide the information to update the existing attributes should such information changes over time. The cached web pages provide a snapshot of the contents of the web pages as of the day of caching. The annotation engine receives a copy of a web page from fetcher 1115 and stores it against the annotation data entry of the URI maintained in index 1114. The content of the copy of the web page may also further be analyzed and indexed. A user may later recall the web page and use it for comparing against a newer version of the web page or any other web page of interest.

System 1100 may receive and maintain annotation entries or data specific to a context or subject matter of interest, e.g., for context of shopping or for a subject matter of shopping for handbags or a particular handbag, the resulting annotation entries may serve as online offers with explicit item descriptions (i.e., identification data) and comparable attributes. For example, if retrieval engine 1113 is looking for items of interest, the retrieval engine may place a primary emphasis on item descriptions if matching user queries against such annotation entries, while treating attributes as dependent to this primary emphasis. A user, in one embodiment, may use a typical Web browser to search or otherwise access such online offers maintained in index 1114 of ACS 1105, in the same or similar manner as it may interact with typical search engines or services. For example, client computer 1102 may send queries to and receive result pages from ACS 1105 through retrieval engine 1113 in the same way as it may with any typical search engine or service. However, unlike result pages from search services 1103 and 1104, the search results received from ACS 1105 comprise recall handles that are all contextually congruent and annotated. ACS 1105 may also provide an input page or interface that accepts individual inputs or search items as attributes or data for the attributes for query, in addition to a description of the item of interest. Client computer 1101 may use the search service provided by ACS 1105, through retrieval engine 1113 of ACS 1105 or have ACS 1105 as one of the search service choices available to accept general textual queries (i.e., one that lacks specifically denoted identification data and attributes) sent from Client computer 1101. For the latter case, the user queries and result pages need not be intercepted or otherwise handled by ACA 1111 of Client computer 1101. For the context-specific general queries, identification data, available attributes and cached copies of the resources maintained in the index may assume different weights in the determination of which annotation entries (and therefore which URIs and resources) are more relevant to the queries from among the available annotation entries. For instance, identification data may have higher weight under typical circumstances.

Figure 12:
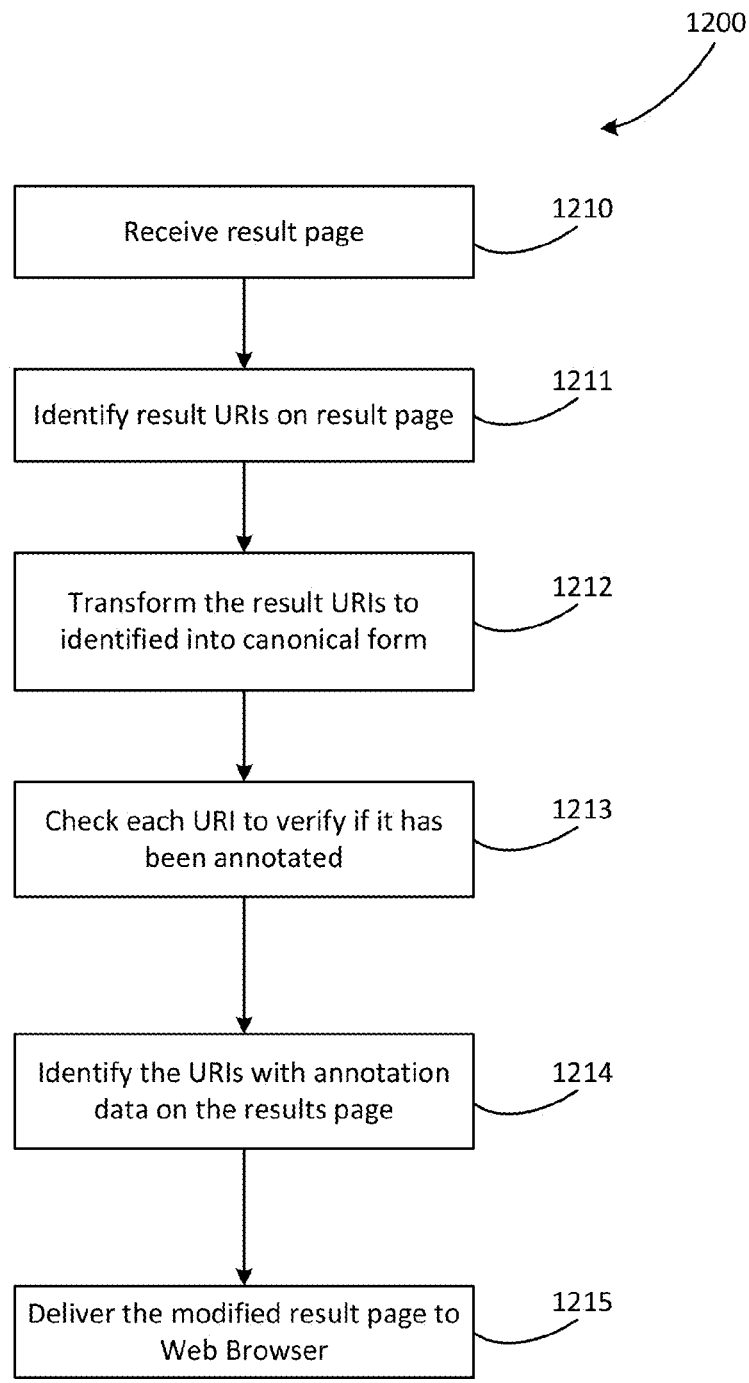
FIG. 12 is a flow diagram of a process for modifying presentation of search results having annotation entries according to an embodiment of the present invention.
Figure 13:
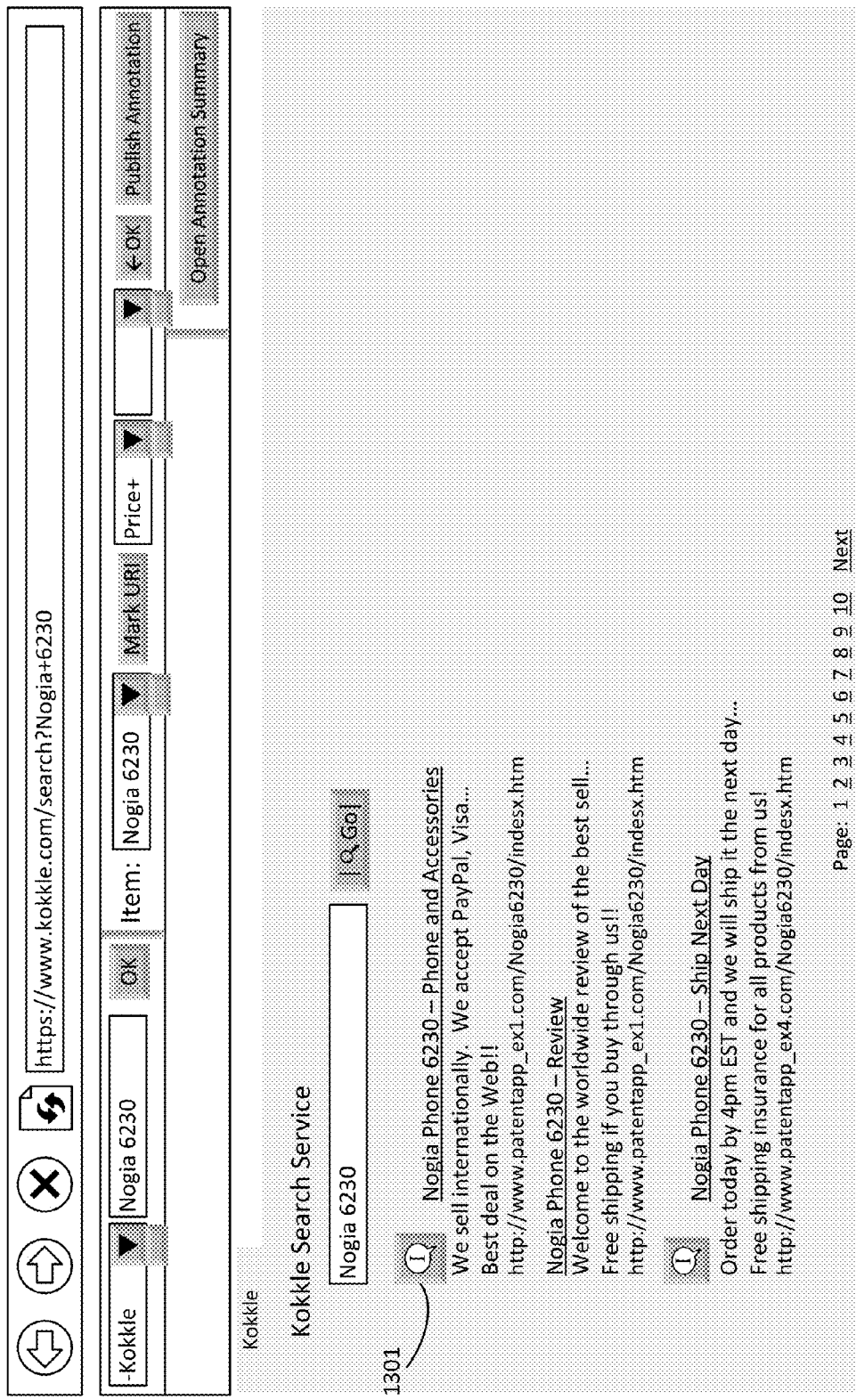
FIG. 13 illustrates modified presentation of search results having annotation entries, according to an embodiment of the present invention.

FIG. 12 is a high-level flow diagram of a process 1200 for modifying search results received from a search engine before being communicated to a UI such as a Web browser, according to an embodiment of the present invention. Process 1200 may be implemented e.g., by ACA 1111 of FIG. 11. At step 1210, the ACA receives the results page from the search engine. At step 1211, the ACA may identify the relevant URIs that correspond to the search terms provided by the user. At step 1212, the ACA transforms the identified URIs into their canonical form. This is done to maintain consistency between disparate URIs. The ACA may communicate with the annotation engine of an ACS to identify the URIs that have annotation data associated with them, at step 1213. The annotation engine of the ACS may query the index of the ACS to determine which of the URIs have annotation data associated with it and communicate that information to the ACA at step 1214. In an embodiment, the ACA may also request the annotation engine to provide entries of URIs equipped with hyper-texting to annotation entries of screened URIs. The ACA may embed such hyper-texting as part of an annotation availability indication in the result page for presentation to the user. At step, 1215, the ACA modifies the result page in accordance to the results obtained from the annotation engine and other relevant information from the ACS (through the annotation engine) and presents the modified page to the user. FIG. 13 provides an illustration of a sample modified results page according to an embodiment of the present invention. In an embodiment, the modified search results that have annotation information available are indicated using annotation indicator 1301. Annotation indicator 1301 is linked to the annotation data for that particular URI. Selecting annotation indicator 1301 will result in the annotation data for the associated URI being presented to the user.

It will be appreciated that process 1200 described herein is illustrative and that variations and modifications are possible. Acts described as sequential may be executed in parallel, order of acts may be varied, and acts may be modified or combined.

In addition, embodiments of the present invention may be realized using any combination of dedicated components and/or programmable processors and/or other programmable devices. While the embodiments described above may make reference to specific hardware and software components as well as organizations and arrangements thereof, those skilled in the art will appreciate that different combinations, variations, and distributions of hardware and/or software components may also be used and that particular operations described as being implemented in hardware might also be implemented in software or vice versa. For instance, multiple processors may be involved in interaction with a user and in the creation and storage of the annotation entities. The annotation entities may be stored in a plurality of storage media, which these processors may access independently. For instance, the attributes and the values associated with the attributes may be stored on separate storage mediums. Further, the creation of annotation entities is not limited to information searched by a user. A content creator may pre-annotate information before making it available to the public at-large. The pre-annotated information may be shared among multiple users. In this case, users may access the pre-annotated information, add their own annotations and share the modified annotated information with other users. In some embodiments, the user may specify a time for which annotated URIs and/or information designated for sharing will be kept private and non-accessible to other users. For instance, the user may specify that his collection of personal annotation entries or his preference or ranking of annotation entries remains private until his current annotation or search session associated with this collection is complete, which may be triggered by various events. For example, in researching for retail online offers, the user may signal the end of session by indicating which annotated online offer he would choose among those that have been collected or included in his collection of annotation entries of online offer for a particular retail product or service. In one embodiment, the user's collection of annotation entries will be cleared upon the end of session, and ready for a new session. In another embodiment, a summary may be provided for an attribute related to annotation entries in a session. For example, a price range may be determined and published for the lowest and highest prices (currency-adjusted, if applicable) of all the annotated online offers in a shopping session. In yet another embodiment, a user may be associated with multiple concurrent sessions, for example, one session for a particular subject matter of interest, such as retail offers for a particular good or service Annotation entries may be related to a particular good or service by having the same, equivalent, or compatible description of a good or service, or a reference to the good or service, or via some other means. An embodiment may also publish or advertise the most chosen or favorite annotation entries based on the interaction of a plurality of users with the available annotation entries. For example, a user may mark an annotation entry as favorite, like, or bookmark. A user may rank a plurality of annotation entries. A user may be allowed only to favor or recommend a limited number of annotation entries during a session of annotation or an interval of time for a particular subject matter of interest. For instance, an embodiment may enable users in a social group to annotate a plurality of retail items or offers on the Web, and to vote or rank among these annotated items or offers, so to rank or determine the most favorable items or offers, for example, as group gifts, group purchases, or some other common purposes. In one embodiment, an annotation entry for an online item or offer of interest may include a photo of the item or a hyperlink (textual, visual, or otherwise) to the offer webpage. In another embodiment, a software button or hyperlink on a webpage may cause creation of or make available an annotation entry, the annotation entry comprising, for example, an attribute (e.g., an image) of an item available online, or an attribute (e.g., a URI) of an offer posted online. The user triggering the software button or hyperlink may specify or select a subject matter (e.g., best gifts, cool nightclubs, or retail offers) with which the annotation entry is associated. The user may further qualify a subject matter that might have otherwise been made available to him for selection, for example, user input of wedding for best gifts and of a particular retail product or service name for retail offers. The user may be regarded as author of the annotation entry or otherwise responsible for the submission of the annotation entry to a system equipped with the present invention. In one embodiment, the software button or hyperlink may be associated with a subject matter, e.g., quality offer, so that the user needs not explicitly provide a subject matter. In another embodiment, attributes and their data may be preconfigured or preloaded, e.g., by the webpage, and they may or may not be editable by the user. The user may also be able to add or remove an attribute or its values. In yet another embodiment, the software button or hyperlink may be activated to present or otherwise be associated with one or more templates of attributes, each template being associated with a subject matter. For example, a user may specify or select a subject matter, the specification or selection of which resulting in the user being presented a template of attributes, with or without preloaded data, for input, edit or confirmation. In one embodiment, a system equipped with the present invention may determine one or more subject matters in question of a document associated with an annotation entry that the system or its proxy receives, for example, based on data, attributes, or data associated with the attributes that are available in the annotation entry, without the user associated with the annotation entry having explicitly specified a subject matter. For instance, an analysis of such data, attributes, or data associated with the attributes, e.g., based on their standalone meanings (pre-defined or otherwise), their semantic relationships and interpretations with other terms therein, a relative likelihood of a group of semantically relevant terms being present together in relation to a particular subject matter, and so on, may be utilized, in part or in whole, to determine a subject matter for the document of interest. In another embodiment, a subject matter of an annotation entry or a document associated with the annotation entry may be pre-assigned or pre-determined without the user associated with the annotation entry having provided an indication of the subject matter, for instance, by having the document or its associated metadata embed such information that may be readable or otherwise interpretable by the invention-embodying system. For example, an author, publisher, or machine generator of the document may have embedded the subject matter information into the document or its metadata, the subject matter information which may or may not be readable or perceivable by the user associated with the annotation entry; or a computer sending the annotation entry to the system may be capable of retrieving subject matter information from or for the document without specific input from the user to perform such retrieval. And the user may, for example, simply submit or cause the computer to submit an annotation entry for the document to the system, the annotation entry comprising subject matter information for the document without the user having provided the subject matter information. In yet another embodiment, data, attributes, or data associated with the attributes available in an annotation entry received by a system equipped with the present invention may be generated without the user associated as an author, submitter, contributor, or originator with the annotation entry having provided the data, attributes, or data associated with the attributes. For instance, an author, publisher, or machine generator of the document may have embedded such data, attributes, or data associated with the attributes into the document or its metadata, such data, attributes, or data associated with the attributes which may or may not be readable or perceivable by the user associated with the annotation entry; or a computer sending the annotation entry to the system may be capable of retrieving such data, attributes, or data associated with the attributes from or for the document without any input from the user. In some embodiments, the user may identify an attribute for inclusion into the annotation entry, and the computer may provide the data associated with the attribute to the annotation entry in response to such act of identifying. In another embodiment, the user may submit or cause the computer to submit an annotation entry for the document to a system equipped with the present invention, the annotation entry comprising data, attributes, or data associated with the attributes in relation to the document, without the user having provided the data, attributes, or data associated with the attributes.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like, whereas suitable transmission media include signals. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed:

1. A computer-implemented method, comprising:
receiving, by a computer system, a first entry that annotates a first document, wherein the first entry is provided by a first user, the first user being associated with a first computer having received an indication of the first document;
receiving, by the computer system, a second entry that annotates a second document, wherein the second entry is provided by a second user, the second user being associated with a second computer having received an indication of the second document;
determining, by the computer system, that each of the first and second entries is associated with common subject matter based at least in part on data, the data originating with a third party; and
presenting, by the computer system, an indication of the first entry and an indication of the second entry to a third user, the third user being associated with a third computer from which an indication of the common subject matter was received.

2. The computer-implemented method of claim 1, further comprising:
receiving, by the computer system, a request from the third user, the request being associated with the common subject matter;
determining, by the computer system, that the request matches the first and second entries; and
sending, by the computer system, the third computer an indication of the common subject matter.

3. The computer-implemented method of claim 1, wherein the first entry comprises the data, the data being associated with the common subject matter and not provided by the first user, and further comprising:
receiving an indication of subject matter from a fourth user, the fourth user being associated with a fourth computer;
determining that each of the first and second entries is associated with the subject matter; and
sending an indication of the first entry and an indication of the second entry to the fourth computer.

4. The computer-implemented method of claim 2, wherein determining that the request matches the first and second entries comprises determining, by the computer system, that the request matches the first and second entries independently of the first and second documents.

5. A computer-implemented method comprising:
identifying, by a computer system, a first document to be annotated;
presenting, by the computer system, to a first computer a required and an optional attribute name for common subject matter for the first document, an annotation for the common subject matter being required to identify data for the required attribute name to be valid, the first computer prompting a first user to provide data for the required and the optional attribute, or to confirm data for the required and the optional attribute data that is proposed;
in relation to presenting to the first computer the required and the optional attribute name, receiving, by the computer system, user input entered at the first user computer;
determining, by the computer system, that the user input is valid in response to determining that the user input is indicative of entering data for the required attribute, or in response to determining that the user input is indicative of confirming the data for the required and optional attribute data that is proposed;
receiving, by the computer system, a first entry that annotates the first document, wherein the first entry is provided by the first user, the first user being associated with the first computer having received an indication of the first document;
receiving, by the computer system, a second entry that annotates a second document, wherein the second entry is provided by a second user, the second user being associated with a second computer having received an indicated of the second document;
determining, by the computer system, that each of the first and second entries is associated with the common subject matter; and
presenting, by the computer system, an indication of the first entry and an indication of the second entry to a third user, the third user being associated with a third computer from which an indication of the common subject matter was received.

6. The computer-implemented method of claim 5, further comprising:
in relation to determining that the required attribute for annotating the document with the common subject matter is required, presenting, by the computer system, a name of the required attribute without user input indicative of selecting the required attribute or the name of the required attribute.

7. The computer-implemented method of claim 6, further comprising:
in relation to presenting the name of the required attribute without the user input indicative of selecting the required attribute or the name of the required attribute, identifying, by the computer system, information contained within the first document, associating the information with the required attribute without user input indicative of identifying the information, and presenting the information along with the name of the required attribute without user input indicative of selecting the required attribute or the name of the required attribute; and
wherein the user input indicative of describing the required attribute for the first document includes user input indicative of acknowledging the required attribute, the required attribute being associated with the information.

8. The computer-implemented method of claim 7, further comprising:
presenting, by the computer system, the first computer with the required attribute name, the required attribute name and the optional attribute name occurring in an order, the required attribute name coming before the optional attribute name in the order; and
in response to receiving user input indicative of providing data for the required attribute name, presenting, by the computer system, the first computer with the optional attribute name.

9. A computer-implemented method, comprising:
receiving, by a computer system, a first entry that annotates a first document, wherein the first entry is provided by a first user, the first user being associated with a first computer having received an indication of the first document;
receiving, by the computer system, a second entry that annotates a second document, wherein the second entry is provided by a second user, the second user being associated with a second computer having received an indication of the second document;
determining, by the computer system, that each of the first and second entries is associated with common subject matter;
associating, by the computer system, an event with the first entry, wherein the event is independent of queries from the first and the second user;
presenting, by the computer system, to a fourth user an indication of the second entry but not an indication of the first entry in response to determining that the event has not taken place; and
presenting, by the computer system, to a third user the indication of the first entry and the indication of the second entry in response to determining that the event has taken place.

10. The computer-implemented method of claim 9, wherein associating the event with the first entry comprises:
associating, by the computer system, the event with a user account, the user account being associated with the first user and the first entry; and
wherein the event includes an expiry of a time period, or a completion of a user session, the user session being associated with the user account.

11. The computer-implemented method of claim 10, wherein the first entry comprises an annotated online offer, and the completion of the user session comprises the first user having decided as the best or accepted another annotated online offer, the annotated online offer and the other annotated online offer being associated with the same user session.

12. One or more non-transitory computer-readable storage media bearing computer-readable instructions that, when executed on a computer system, cause the computer system to perform operations comprising:
receiving an indication of a first entry, the first entry annotating a first document, wherein the first entry is provided by a first user, the first user being associated with a first computer having received an indication of the first document, wherein the first entry comprises data, the data being associated with subject matter and not provided by the first user;
receiving an indication of a second entry, the second entry annotating a second document, wherein the second entry is provided by a second user, the second user being associated with a second computer having received an indication of the second document;

receiving an indication of the subject matter from a third user, the third user being associated with a third computer;

determining that each of the first and second entries is associated with the subject matter; and sending an indication of the first entry and an indication of the second entry to the third computer.

13. The one or more non-transitory computer-readable storage media of claim 12, further bearing computer-readable instructions that, when executed on the computer system, cause the computer system to perform operations further comprising:

wherein the first entry comprises a second data, the second data being associated with the first user;

receiving a third data from a third user, the third user being associated with a third computer having received an indication of the first document and an indication of the first entry;

generating the data based at least on the third data; and updating the second data with the data.

14. The one or more non-transitory computer-readable storage media of claim 12, wherein receiving the indication of the first entry comprises:

receiving the indication of the first entry, the first entry annotating the first document, wherein the first entry is submitted by the first user, the first user being associated with the first computer having received the indication of the first document and another indication of the first entry, wherein the first entry comprises the data, the data being associated with the subject matter and not provided by the first user, the first user selects the other indication of the first entry, and the originating of the first entry is attributable to the first user.

15. A system, comprising:

a processor; and a memory communicatively coupled to the processor when the system is operational, the memory bearing processor-executable instructions that, when executed on the processor, cause the system at least to:

receive, by a computer system, a first entry that annotates a first document, wherein the first entry is provided by a first user, the first user being associated with a first computer having received an indication of the first document;

receive, by the computer system, a second entry that annotates a second document, wherein the second entry is provided by a second user, the second user being associates with a second computer having received an indication of the second document;

determine, by the computer system, that each of the first and second entries is associated with common subject matter, wherein each of the first and second entries comprises an attribute and data associated with the attribute, the first entry's attribute being semantically compatible with the second entry's attribute, and the first entry's attribute and the second entry's attribute being defined for the common subject matter; and present, by the computer system, an indication of the first entry and an indication of the second entry to a third user, the third user being associated with a third computer from which an indication of the common subject matter was received.

16. The system of claim 15, wherein the memory further bears processor-executable instructions that, when executed on the processor, cause the system at least to:

compare, by the computer system, the first entry's attribute to the second entry's attribute; and present, by the computer system, to the third user comparison results, the comparison results comprising an indication of the first document, an indication of the second document, and an indication of the compared attributes.

17. The system of claim 15, wherein data associated with the first entry's attribute is provided by the first user, and data associated with the second entry's attribute is provided by the second user.

18. The system of claim 15, wherein data associated with the first entry's attribute is provided by the first computer without input from the first user, and data associated with the second entry's attribute is provided by the second computer without input from the second user.

19. The system of claim 15, wherein the memory further bears processor-executable instructions that, when executed on the processor, cause the system at least to:

determine data for another attribute based at least on the first entry's attribute; and associate the data with the other attribute and the other attribute with the first entry.

20. The system of claim 15, wherein the first entry's attribute and the second entry's attribute comprise a plurality of attributes, and wherein the memory further bears processor-executable instructions that, when executed on the processor, cause the system at least to:

receive from the third user an indication of prioritized or weighted attributes preference; and generate a list of indications of entries based on the prioritized or weighted attributes preference, the list of indications comprising the indication of the first document and the indication of the second document, wherein the list of indications of entries comprises the indication of the first entry and the indication of the second entry.

* * * * *